Jan. 21, 1964   K. H. BRAUDORN   3,118,481
DETACHABLE ANTI-SKID MEANS FOR RUBBER TIRES OF VEHICLES
Filed July 30, 1962

Inventor
Karl Harry Braudorn
By
Patent Agent

United States Patent Office 3,118,481
Patented Jan. 21, 1964

3,118,481
DETACHABLE ANTI-SKID MEANS FOR RUBBER TIRES OF VEHICLES
Karl Harry Braudorn, Hannover, Germany, assignor to Continental Gummi-Werke Aktiengesellschaft, Hannover, Germany
Filed July 30, 1962, Ser. No. 213,323
Claims priority, application Germany Aug. 1, 1961
6 Claims. (Cl. 152—222)

The present invention relates to anti-skid means for vehicle rubber tires having continuous depressions and elevations in conformity with the respective profile of the tire. The anti-skid means involved in the present invention are of the type which are placed into the profile of the tire.

It is an object of the present invention to provide anti-skid means which may be detachably connected to a tire in a very simple manner and may easily be removed therefrom whenever desired.

It is another object of this invention to provide anti-skid means as set forth in the preceding paragraph, which will be particularly useful as protection against skidding on slippery ice.

These and other objects and advantages of the invention will appear more clearly from the following specification in connection with the accompanying drawing, in which.

The anti-skid means according to the present invention comprise individual anti-skid members of an elastic material which are inserted in the depressions of the tire profile and surround elevations of the tire profile while being equipped with metallic inserts protruding outwardly beyond the outer surface of the elastic material of the anti-skid member. According to a preferred embodiment of the invention, the thickness of the anti-skid members is so dimensioned that it corresponds to the depth of the recesses in the tire tread in radial direction, so that the outer surfaces of the anti-skid members in assembled condition thereof are flush with the outer tread surfaces of the tire.

Figure 2:
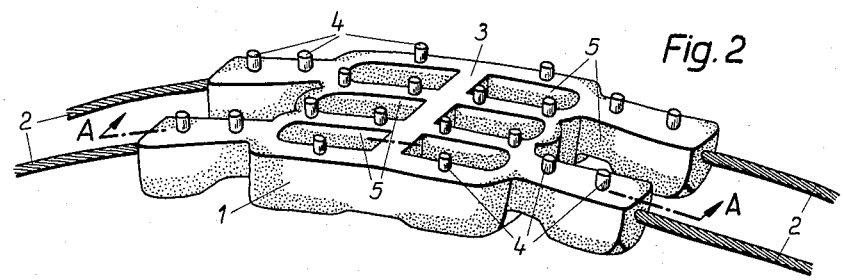
FIGURE 2 is a perspective view of an anti-skid member according to the invention on a larger scale than that of FIGURE 1.
Figure 3:
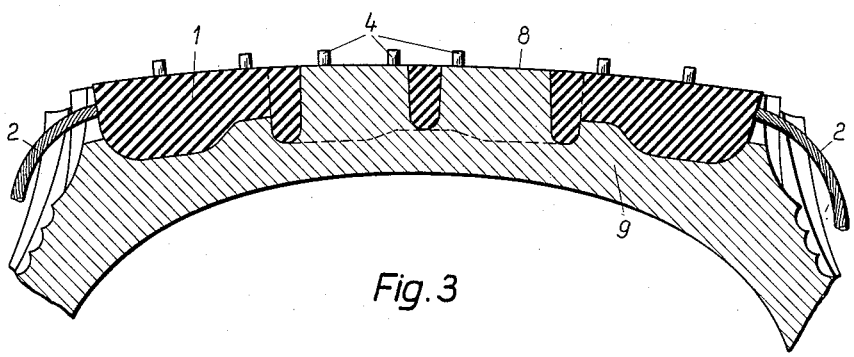
FIGURE 3 illustrates a cross-section through a portion of a vehicle tire with inserted anti-skid member according to the invention, said section being taken along the line I—I of FIGURE 2.

Referring now to the drawing in detail, the individual anti-skid member shown in FIG. 2 comprise a perforated rubber body 1 with closed loops 2 at both sides of said body 1 and formed, for instance, by wire cables. The anti-skid member shown in FIG. 2 is furthermore equipped with anti-skid inserts 4. The body 1 is shaped in conformity with the respective tread profile of the tire so that the body 1 can, in its perforations 5, receive the elevations of the tread profile, while being able to fill the depressions in the tread profile. Thus, the anti-skid member represents a negative image of the tread profile. Inasmuch as the anti-skid member is so mounted in the tire 9 that it positively engages the tread profile in axial and also in circumferential direction of the wheel (see also FIG. 3), simple pull elements, for instance, in the form of wire cable loops 2, suffice for securing the anti-skid member against movement in radial direction, especially inasmuch as, due to the reduced driving speed when driving with the anti-skid means according to the invention, only relatively low forces occur in radial direction of the wheel. The wire cables 2 preferably extend through and are embedded in the body 1 and protrude at both sides of the body 1 in the form of loops of desired length. By means of simple hooks 6 mounted on both sides of the rim 7, the loops 2 can quickly and without any great effort, be connected to the vehicle wheels. It is merely necessary to slip the loops over said hooks.

The anti-skid elements proper are formed by metallic inserts 4 which consist of metallic wires embedded in the material of the body 1 and protruding from the surface 3 in the form of short pins or prongs. Inasmuch as the surface 3 of the body 1 in assembled condition of the anti-skid members is flush with the thread surface 8 of the tire, the wire pins will directly contact the ground or ice and therefore bring about a highly effective anti-skid effect. In order to better hold the pins 4 against shearing forces and in order to increase the resistance of said pins against pull-out, the pins 4 are preferably at least partially intertwined, or the like, within body 1.

Figure 1:
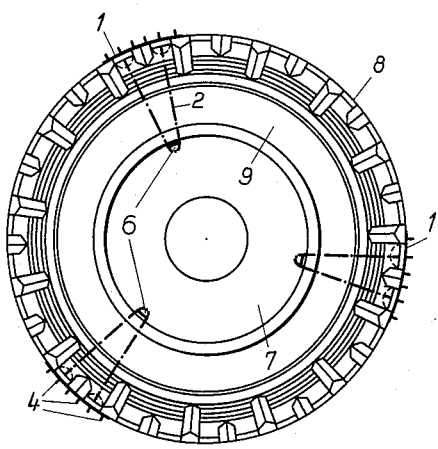
FIGURE 1 illustrates a vehicle wheel with a tire having mounted thereon three-part anti-skid means according to the present invention.

According to FIG. 1, three of the above-described anti-skid members have been evenly distributed over the circumference of the tire 9 and connected thereto. However, the number of the individual anti-skid members may be selected at random and may be varied in conformity with the tire diameter and in conformity with the prevailing road conditions. Also, the width of the anti-skid members may be varied in circumferential direction of the tire 9, in conformity with the respective conditions.

The anti-skid means according to the present invention are primarily intended for use when driving over slippery ice and at similar slippery road conditions, and have important advantages over heretofore known anti-skid means. Due to the fact that the anti-skid members are designed in conformity with the respective prevailing tread profile, the individual anti-skid members are, without further aids, positively secured against circumferential forces occurring on the tire during driving, so that simple pull elements will suffice for connecting the anti-skid members to the rim. These pull elements may, for instance, be in the form of wire cables embedded in the body of the anti-skid member and protrude laterally therefrom in the form of closed loops. Inasmuch as the anti-skid members practically completely fill the respective portions of the tread profile, their outer surface is flush with the tread surface so that the anti-skid bodies do not form an outwardly protruding foreign body liable to cause undesired deformations of the tire. With this arrangement of the anti-skid members, the metallic inserts protrude beyond the tread surface of the tire and can properly engage the ice layer on the road surface. As has been brought out above, the anti-skid members can easily be connected to the rim by suspending the anti-skid members on their loops on suitable protrusions of the rim or wheel. Generally, it is sufficient to arrange three or four anti-skid members evenly distributed over the circumference of the tire so that the mounting and detaching of the anti-skid members, according to the present invention, can be accomplished in a very short time, while on the other hand, the said anti-skid members require but very little storage space.

A particular advantage of the anti-skid means according to the invention is seen in the easy handling thereof so that during winter driving, the anti-skid means may be employed only when driving over icy surfaces and can, within a few minutes, be removed if they are no longer needed, which, of course, is important for the total life of the anti-skid members.

It is, of course, to be understood that the present invention is, by no means, limited to the particular construction shown in the drawing, but also comprises any modifications within the scope of the appended claims.

Thus, while as elastic material for the anti-skid member rubber material—natural or synthetic—is preferred, also other elastic material may be employed for this purpose.

What I claim is:

1. A detachable anti-skid member for insertion into a circumferential region of a profiled tread strip of a vehicle tire, which comprises a body of elastic material in the form of intersecting ribs, the spaces between said ribs forming passages extending through said body, said ribs being adapted to fit into grooves of said profiled tread strip and said passages being adapted to receive elevations of said profiled tread strip, said ribs having a height not exceeding the height of said elevations, a plurality of metallic wear-resistant elements embedded in said body and protruding therefrom on the outer side only of the body for engagement with a road surface, and means for retaining said body in place in said tread strip.

2. A detachable anti-skid member for insertion into a circumftrential region of a profiled tread strip of a vehicle tire, which comprises a body of elastic material in the form of spaced intersecting ribs, the spaces between said ribs forming passages extending through said body, said ribs being adapted to fit into grooves of said profiled tread strip and said passages being adapted to receive elevations of said profiled tread strip, said ribs having a height not exceeding the height of said elevations, metallic wires embedded in said body and protruding therefrom in the outward direction only for engagement with a road surface, and means for securing said body to said tire.

3. A detachable anti-skid member for insertion into a profiled tread strip of a vehicle tire, which comprises a body of elastic material having ribs and also having passages extending through said body for, respectively, fitting into grooves of said profiled tread strip and for receiving elevations of said profiled tread strip, metallic wires embedded in said body and protruding outwardly therefrom for engagement with a road surface, and means for securing said body to said tire, said metallic wires being interconnected within said body.

4. A detachable anti-skid member for insertion into a profiled tread strip of a vehicle tire, which comprises a body of elastic material having ribs and also having passages extending through said body for, respectively, fitting into grooves of said profiled tread strip and receiving elevations of said profiled tread strip, metallic wires embedded in said body and protruding outwardly therefrom for engagement with a road surface, means for securing said body to said tire, and flexible connecting means connected to the ends of said anti-skid member at the sides of the tire tread strip for connection with a vehicle wheel to retain said member in place on the tire, said ribs including laterally extending portions disposed in said tread strip laterally of the running surface thereof.

5. A detachable anti-skid member for insertion into a profiled tread strip of a vehicle tire which comprises a body of elastic material having ribs and also having passages extending through said body for, respectively, fitting into grooves of said profiled tread strip and for receiving elevations of said profiled tread strip, metallic wires embedded in said body and protruding outwardly therefrom for engagement with a road surface, means for retaining said body in place in said tread strip, and wire cables embedded in said body and respectively protruding from the ends thereof at the sides of the tire tread strip in the form of loops for connection with a vehicle wheel to retain said member in place on the tire, said ribs including laterally extending portions disposed in said tread strip laterally of the running surface therefrom.

6. In combination: a vehicle wheel provided with a tire having a tread strip with grooves and elevations, an anti-skid member for mounting on the tire and extending about only a part of the circumference of the tire and having a body of elastic material with spaced ribs and with passages between the ribs, said ribs being fitted into said grooves and said passages receiving said elevations, said ribs having a height not greater than the height of said elevations, a plurality of metallic wear-resistant elements embedded in said body and protruding therefrom in the outward direction only and beyond said tread strip in substantially radial direction of the latter, and gripper means connected to said body at the sides of the tire tread strip and respectively protruding from the ends thereof in the form of loops and connected to the sides of said wheel.

References Cited in the file of this patent
UNITED STATES PATENTS

| | | |
|---|---|---|
| 1,267,544 | Haubner | May 28, 1918 |
| 1,311,750 | Brashear | July 29, 1919 |
| 1,878,679 | De Bruijn | Sept. 20, 1932 |
| 2,687,160 | Norton | Aug. 24, 1954 |